United States Patent [19]

Child

[11] 4,247,138
[45] Jan. 27, 1981

[54] SHOCK ABSORBING APPARATUS FOR VEHICLES

[75] Inventor: James R. Child, Clwyd, England
[73] Assignee: Quinton Hazell Limited, England
[21] Appl. No.: 28,024
[22] Filed: Apr. 6, 1979
[51] Int. Cl.³ .............................................. B60R 19/02
[52] U.S. Cl. ..................................... 293/103; 293/131
[58] Field of Search ................ 293/103, 131, 132, 134, 293/34, 35, 36, 37

[56] References Cited

U.S. PATENT DOCUMENTS 2,588,815  3/1952  Fasolino ................................. 293/4
3,913,963  10/1975  Persicke ................................. 293/134

Primary Examiner—John J. Love
Assistant Examiner—John A. Carroll
Attorney, Agent, or Firm—Karl W. Flocks

[57] ABSTRACT

A shock absorbing apparatus suitable for use on a load carrying vehicle at the rear and/or front thereof comprises an arm pivotable to the frame or chassis of the vehicle close to the end thereof and extending downwardly to support on its lower end a horizontally disposed bumper bar extending across the vehicle, a shock absorbing device pivoted to the arm between said pivot and the bar and pivoted to the vehicle frame or chassis at a point spaced along the vehicle from said arm pivot, said three pivots forming the three apices of a triangle, lost motion means associated with at least one of said pivots to vary the configuration of said triangle to permit the arm to swing upwardly away from the vehicle frame or chassis to clear ground height variations in the path of the bar, and means to restore the arm to its normal position when the bar is clear of such ground variations.

9 Claims, 3 Drawing Figures

SHOCK ABSORBING APPARATUS FOR VEHICLES

BACKGROUND OF THE INVENTION

1. Field of the Invention

This invention relates to shock absorbing apparatus suitable for use on load carrying vehicles such as lorries, coaches, buses and trains and to vehicles equipped with such apparatus.

2. Description of Prior Art

It is known to provide load carrying vehicles with shock absorbing apparatus such as bumper bars at the front and rear at a specific height so that when vehicles in line one behind the other bump into each other, the bumper bars absorb the shock of impact and shock absorbing means may be incorporated to assist in such shock absorption.

A difficulty sometimes encountered with such shock absorbing devices is that they are sufficiently close to the ground at their lowest point to be damaged on uneven ground surfaces and when driving the vehicles onto the ramps of roll-on roll-off ferries. To be effective it has been found that the shock absorbing apparatus must be constructed so that there is not more than about 18 to 20 inches from the underside of the bumper bar across the vehicle to the ground surface in the normal i.e. undeflected position. These requirements vary from country to country according to the requirements of national laws and local regulations. However with these dimensions there is the problem that when the vehicle rolls or is driven into or off a sloping ferry ramp the bumper bar is over the ramp while the vehicle wheels are on the adjacent ground and thus the bumper bar can engage the ramp surface. In such event the shock absorbing apparatus and/or ramp is damaged. Similar difficulties arise when the vehicle is driven over rough or undulating ground.

The main object of the present invention is to provide improved shock absorbing apparatus of this general type in which the aforesaid difficulties are minimised or eliminated.

SUMMARY

According to the present invention a shock absorbing apparatus suitable for use on a load carrying vehicle at the rear and/or front thereof comprises an arm pivotable to the frame or chassis of the vehicle close to the end thereof and extending downwardly to support on its lower end a horizontally disposed bumper bar extending across the vehicle, a shock absorbing device pivoted to the arm between said pivot and the bar and pivoted to the vehicle frame or chassis at a point spaced along the vehicle from said arm pivot, said three pivots forming the three apices of a triangle, lost motion means associated with at least one of said pivots to vary the configuration of said triangle to permit the arm to swing upwardly away from the vehicle frame or chassis to clear ground height variations in the path of the bar, and means to restore the arm to its normal position when the bar is clear of such ground variations.

In one preferred construction the lost motion means comprises a longitudinal slot in the arm, a pivot pin on the lower end portion of the shock absorbing device engaging in said slot and urged to one end of the slot by the shock absorbing means but allowing upward swing of the arm away from the vehicle body or chassis, and restoring means to return the arm to the normal position when free to do so.

The shock absorbing device comprises a telescopic hydraulic or equivalent element capable of contraction when the bar is forced towards the vehicle but not of extension when the bar is moved upwardly away from the vehicle, and a spring or equivalent means operable to return the arm to its normal position after being moved towards or away from the vehicle.

The shock absorbing device preferably comprises a compressible element having means to restore it to its normal condition after compression and the arm has an abutment engaging the compressible element and acting to compress the element when the arm is swung upwardly away from the vehicle.

From another aspect the invention includes a load carrying vehicle incorporating or having mounted thereon a shock absorbing apparatus of the invention.

DESCRIPTION OF PREFERRED INVENTION

In order that the invention may be more fully understood an embodiment in accordance therewith will now be described by way of example with reference to the accompanying drawings in which.

Similar references in all the Figures represent the same or similar parts.

Figure 1:
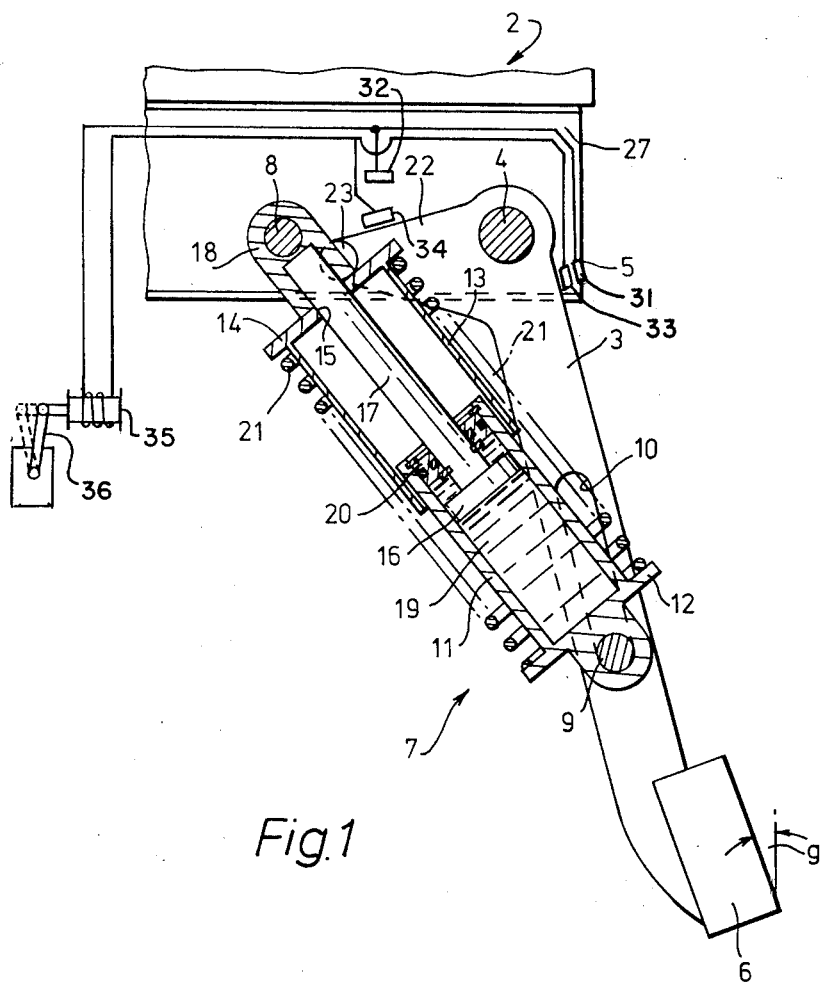
FIG. 1 is a diagrammatic view of a shock absorbing apparatus mounted on the rear of a load carrying vehicle and disposed in its normal i.e. rest position.

Referring to the drawings, these show the shock absorbing apparatus and the rear of a load carrying vehicle at 2. While the drawings show one side of the rear of the vehicle 2 it will be understood that a similar construction is provided at the other side of the vehicle and the whole shock absorbing apparatus may be provided at the front end of the vehicle.

The shock absorbing apparatus has an arm 3 pivoted or hinged by a pin or axle 4 to the chassis 5 or other part of the vehicle body, and has secured by any suitable connecting means such as by welding, rivets, or interlocking dovetail forms (not shown), at its lower end a bumper bar 6; the bar 6 extends across the full width of the vehicle but it may consist of a half bumper bar extending across one side of the vehicle, a similar half being on an arm 3 at the other side of the vehicle. The bumper bar may however be pivoted to the lower end of the arm or arms 3.

A shock or energy absorbing device 7 is articulated by pivots or axles 8, 9 respectively to the vehicle chassis or body 5 at its upper end and to the arm 3 between the pivot 4 and bar 6, by a pin 9 engaging in a slot 10 in the arm. The pivots 4, 8 and 9 thus form the apices of a triangle, the side 8–9 of which can vary in length when the apparatus is displaced due to an impact on the bar 6. Alternatively the lengths 8–4 and 9–4 can be similarly varied or any one of these and 8–9 or any two of them can be varied for the purpose of varying the dimensions of this triangle. The dimensions of this triangle, within predetermined limits are defined so as to dispose the rear face of the bar 6 at a predetermined angle g to the vertical and to provide movement of the bar 6 from the normal position (FIG. 1) to a displaced position (FIG. 2) when subjected to impact of a crashing vehicle from the rear and/or when backing the vehicle into an obstruction.

The shock absorbing device comprises a main cylinder 11 rigid with the bottom plate 12 carrying the bearing for the pivot pin 9. Sliding telescopically over the cylinder 11 is a cylindrical cap 13 having a closed top 14 with an aperture 15. A piston 16 slides in the cylinder 11 and its piston rod 17 extends through the aperture 15; the free end of the rod 17 is secured to a bearing 18 having a bore to receive a pin 8 rotatable in a bearing (not shown) in a bore in the vehicle chassis or frame.

In the normal position shown in FIG. 1 the fluid 19 in the cylinder 11 surrounds the piston 16 and is retained by a stuffing box 20 round the piston rod 17, the function of which will be explained. Surrounding the cap 13 and cylinder 11 is a spring 21 initially compressed between the plate 12 and the cap top plate 14 to urge the plate 14 into engagement with the bearing 18. The arm 3 has a bell crank extension 22 carrying at its end a pin 23 which in the normal position bears on the plate 14 at a point opposite to the spring at substantially the same distance from the pivot 9 as the shoulder on the plate 14.

The spring 21 may be stabilised in guides by a shroud not shown, enclosing the shock absorber to assist in the deflection of dirt, grease, moisture and other impurities.

The shock absorber may be of the kind described in U.K. Pat. Nos. 1,500,514, 1,455,847, 1,478,849, inter alia piston 16 being provided as in said specifications with a passage therethrough or by-passing it whereby on displacement of the piston in the cylinder the fluid normally oil, in the cylinder will be forced passed the piston to absorb the energy of an impact on the arm 3 and/or the bar 5.

Another form of shock absorber which could be used is a compressed gas spring or calibrated compression or tension spring or equivalent resilient shock absorbing device and/or recoil device which may be of conventional construction.

Figure 2:
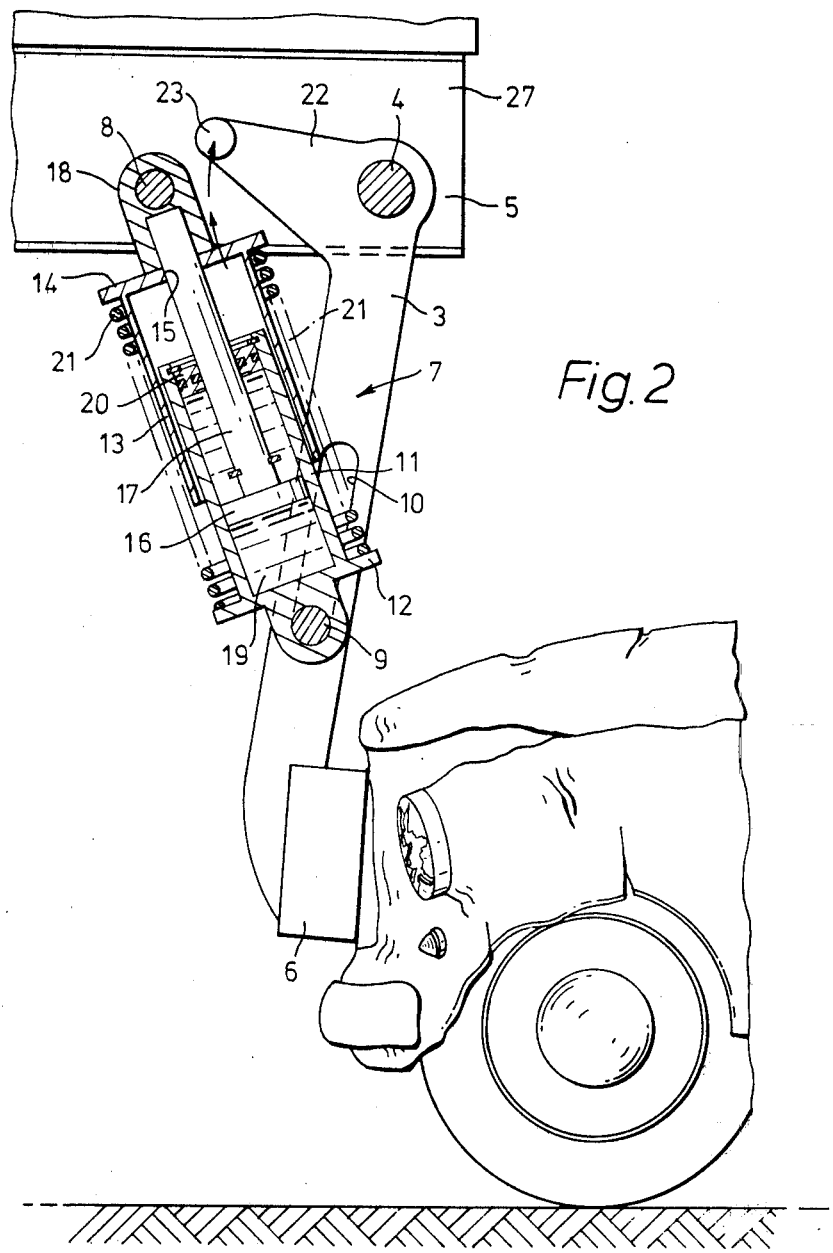
FIG. 2 is a similar view to FIG. 1 showing the shock absorbing apparatus after impact by a vehicle crashing into the rear of the load carrying vehicle.

The engagement of the pin 9 in the slot 10 forms a lost motion device between the shock absorber 7 and the arm 3. As shown in FIG. 2 if a vehicle crashes into the bar 6 and/or the arm 3 the arm will swing to the left in the drawings thereby shortening the shock absorber so that the force of the spring 21 will retain the pin at the lower end of the slot 10. At the same time the pin 23 is moved off the plate 14 which thus remains forced against the bearing 18. By this shortening of the shock absorber a retarding force is generated which is transmitted through the pin 9 and the arm 3 and the bar 6 to the impacting vehicle. The product of the retarding force multiplied by the distance moved by the bar 6 represents approximately the amount of the impact kinetic energy absorbed by the shock absorber apparatus and thus abstracted from the total energy available to cause injury to the occupants of and damage to the vehicle concerned. Practical tests on the apparatus mounted on a vehicle have shown that a large proportion of the energy of impact is thus safely dissipated in an impact on the shock absorbing apparatus of a standard automobile at speeds typically experienced in use. Equally when the vehicle is reversed into an object the shock of impact will be usefully or substantially absorbed prior to any functioning of the apparatus as herein referred to to cause the vehicle brakes to be applied.

On completion of the collapsing movement of the shock absorbing device 7 on impact, it remains in position acting as a rigid strut between the pivots 8, 9 and prevents further movement of the beam 6. The structure then acts as for a conventional bumper bar rigid with the vehicle and resists further encroachment by the impacting vehicle up to the maximum force required to damage the apparatus. This strength of the apparatus is designed to be within values required for such apparatus by national or local legislations or safety regulations.

The spring 21 in such an impact reacts against the absorber and through the plate 14 and the plate 12 to restore the shock absorber to its normal condition (FIG. 1) when the impact forces are removed and the bar 6 made free. This restoration should be such that it will be complete before the vehicle to which it is fitted continues on its journey.

Figure 3:
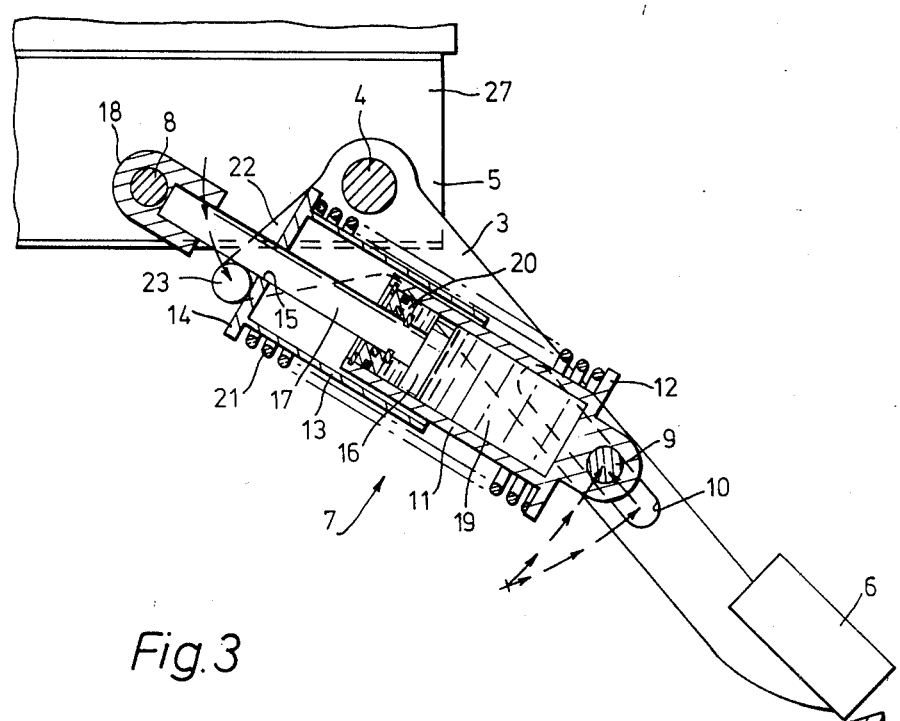
FIG. 3 is a similar view of FIG. 1 showing the shock absorbing apparatus in the breakaway position, i.e. when swung upwardly away from the load carrying vehicle.

Referring to FIG. 3, this shows the rear of the truck having come down a ramp 25 e.g. as on a roll-on roll-off ferry, so that its road wheels (not shown) are on the flat quayside 26 and its rear chassis portion 27 to which the pin 4 is articulated will be at a height from the surface of the ramp which is less than that of the bottom of the bar 6 from the bottom of the chassis 27. Unless safety provision is made the bar 6 would crash on to the ramp and destroy the shock absorbing apparatus and/or ramp.

In the construction shown in the drawings the movement of the vehicle to the position shown in FIG. 3 will result in the bottom of the beam 6 brushing along the surface of the ramp and since the pin 9 can slide in the slot 10 this permits the arm 3 to swing rearwardly so that the bar is not damaged but moves freely along the top of the ramp.

In this operation the pin 23 forces the plate 14 towards the pin 9 thereby compressing the spring 21 and thus controlling the movement rearwardly of the arm 3 without displacement of the piston 16 in the cylinder 11. When the vehicle rides free of the ramp the spring 21 will enable the plate 14 to be returned to engage against the bearing 18 as the pin 23 swings away from the plate 14.

Thus any force tending to rotate the arm 3 about the pivot 4 in either direction is opposed by compression of the spring 21. In the breakaway position in FIG. 3 this is effected directly by the pin 23 pushing away the plate 14 from the bearing 18, the reaction from the spring being transmitted through the cylinder 11, 13 to the pin 8 as the pin 9 slides freely in the slot 10. No energy is absorbed other than friction and internal loads.

It will be understood that in the case of an accident impact as in FIG. 2 the function of the shock absorbing apparatus is similar to that described in U.K Pat. No. 1,478,849.

Moreover electric contacts 31 and 32 on the vehicle chassis and 33 and 34 on the arm 3 and bell crank 22, respectively, may be provided which on displacement of the bumper bar in an anticlockwise or upward direction or clockwise or in a downward direction will cause the closing of an electric circuit causing electrical means such as a solenoid 35 or relay to operate to initiate control 36 causing variation in fuel supply to the vehicle prime mover, variation in engine speed of the prime mover and/or the vehicle road wheel brakes or other means which controls the functioning of the vehicle.

It will thus be seen that by means of the apparatus of the invention a shock absorber arrangement is provided which functions adequately within national and local authority regulations, to absorb impact forces on a load carrying vehicle but provides safety measures to prevent damage to the shock absorber apparatus when travelling over rough ground or up and down inclined ramps.

I claim:

1. A shock absorbing apparatus suitable for use on the structure of a load carrying vehicle comprising
   an arm extending downwardly from the vehicle structure,
   a first pivotal connection pivotally connecting said arm to the vehicle structure,
   a horizontally disposed bumper means supported on the lower end of said arm,
   a shock absorbing device connected between the vehicle structure and said arm,
   a second pivotal connection pivotally connecting said shock absorbing device to the vehicle structure at a point spaced along the vehicle structure from said first pivotal connection,
   a third pivotal connection pivotally connecting said shock absorbing device to said arm between said first pivotal connection and said bumper means,
   said first, second and third pivotal connections forming the apices of a triangle,
   lost motion means to vary the configuration of said triangle associated with at least one of said pivotal connections and to permit said arm to swing upwardly away with respect to the vehicle structure,
   said shock absorbing device including means to restore said arm downwardly to its normal position.

2. The shock absorbing apparatus of claim 1 further characterized by
   said lost motion means including
      a longitudinal slot in said arm,
      and a pivot pin on the lower portion of said shock absorbing device associated with said third pivotal connection and engaging in said slot,
      said restoring means of said shock absorbing device urging said pivot pin to one end of said slot, and movement of said pin in said slot allowing the upward swing of said arm away from said vehicle structure.

3. The shock absorbing apparatus of claim 1 or 2 further characterized by
   said shock absorbing device including
      means to change the length of said shock absorbing device capable of contraction when said bumper means is forced towards the vehicle structure,
      and said restoring means including compressible means operable to return said arm to its normal position after it has been moved either towards or upwardly away from the vehicle structure.

4. The shock absorbing apparatus of claim 3 further characterized by
   said compressible means being a spring maintained under compression.

5. The shock absorbing apparatus of claim 4 further characterized by
   said length changing means of said shock absorbing device including telescoping elements.

6. The shock absorbing apparatus of claim 3 further characterized by
   said restoring means further including
      an abutment on said arm engaging said length changing means and acting to compress said length changing means when said arm is swung upwardly away from the vehicle structure.

7. The shock absorbing apparatus of either claim 1 or 2 further characterized by
   an electrical circuit having closing means to energize said circuit when said arm is deflected from its normal position to control movement of the vehicle.

8. The shock absorbing apparatus of claim 3 further characterized by
   an electrical circuit having closing means to energize said circuit when said arm is deflected from its normal position to control movement of the vehicle.

9. The shock absorbing apparatus of claim 6 further characterized by
   an electrical circuit having closing means to energized said circuit when said arm is deflected from its normal position to control movement of the vehicle.

* * * * *